(12) United States Patent
Villegas et al.

(10) Patent No.: US 11,232,213 B2
(45) Date of Patent: Jan. 25, 2022

(54) MIXED HARDWARE AND SOFTWARE INSTRUCTIONS FOR CRYPTOGRAPHIC FUNCTIONALITIES IMPLEMENTATION

(71) Applicants: GEMALTO SA, Meudon (FR); ISSM, Meyreuil (FR)

(72) Inventors: Karine Villegas, Gemenos (FR); Fabrice Perion, Gemenos (FR); Jean Roch Coulon, Meyreuil (FR); Sylvere Teissier, Meyreuil (FR)

(73) Assignee: THALES DIS FRANCE SA, Meudon (FR)

( * ) Notice: Subject to any disclaimer, the term of this patent is extended or adjusted under 35 U.S.C. 154(b) by 237 days.

(21) Appl. No.: 15/754,941

(22) PCT Filed: Jul. 5, 2016

(86) PCT No.: PCT/EP2016/065852
§ 371 (c)(1),
(2) Date: Feb. 23, 2018

(87) PCT Pub. No.: WO2017/032495
PCT Pub. Date: Mar. 2, 2017

(65) Prior Publication Data
US 2019/0138735 A1  May 9, 2019

(30) Foreign Application Priority Data
Aug. 27, 2015 (EP) ..................... 15306322

(51) Int. Cl.
*G06F 21/60* (2013.01)
*G06F 11/30* (2006.01)
(Continued)

(52) U.S. Cl.
CPC .............. *G06F 21/602* (2013.01); *G09C 1/00* (2013.01); *H04L 9/002* (2013.01);
(Continued)

(58) Field of Classification Search
CPC ......... G06F 21/602; G09C 1/00; H04L 9/002; H04L 2209/04
(Continued)

(56) References Cited

U.S. PATENT DOCUMENTS 7,620,821 B1 * 11/2009 Grohoski .............. G06F 9/3851
380/1
9,485,088 B2 * 11/2016 Johnson ................ H04L 9/0631
(Continued)

FOREIGN PATENT DOCUMENTS

WO   WO2013/004487 A2 *  1/2013
WO   WO 2013/004487 A2   1/2013

OTHER PUBLICATIONS

International Search Report (PCT/ISA/210) dated Sep. 14, 2016, by the European Patent Office as the International Searching Authority for International Application No. PCT/EP2016/065852.
(Continued)

*Primary Examiner* — Darshan I Dhruv
(74) *Attorney, Agent, or Firm* — Buchanan Ingersoll & Rooney PC

(57) ABSTRACT

The present invention relates to a device having a central processing unit, RAM memory and at least two hardware elementary operations, using registers of greater size than the one of the central processing unit, said device being such that construction of at least one part of RAM memory is managed only by the hardware elementary operations, hardware elementary operations themselves and masking of inputs/outputs/intermediary data are monitored by software instructions, said software instructions being able to address different cryptographic functionalities using said hardware elementary operations according to several ways depending on each concerned functionality, said software instructions
(Continued)

being further able to address several levels of security in the execution of the different functionalities.

6 Claims, 1 Drawing Sheet

(51) Int. Cl.
    *G06F 12/14*     (2006.01)
    *H04L 9/00*     (2006.01)
    *G09C 1/00*     (2006.01)

(52) U.S. Cl.
    CPC .. *G06F 2221/2107* (2013.01); *H04L 2209/04* (2013.01); *H04L 2209/12* (2013.01)

(58) Field of Classification Search
    USPC ........................................................ 713/189
    See application file for complete search history.

(56) References Cited

U.S. PATENT DOCUMENTS

| | | | | |
|---|---|---|---|---|
| 2009/0172363 | A1* | 7/2009 | Orenstien | G06F 9/30036 712/225 |
| 2010/0037069 | A1* | 2/2010 | Deierling | G06F 21/602 713/193 |
| 2014/0189713 | A1* | 7/2014 | Ben-Kiki | G06F 9/3877 718/108 |
| 2014/0344815 | A1* | 11/2014 | Ginzburg | G06F 9/485 718/101 |
| 2014/0359629 | A1* | 12/2014 | Ronen | G06F 9/461 718/102 |

OTHER PUBLICATIONS

Written Opinion (PCT/ISA/237) dated Sep. 14, 2016, by the European Patent Office as the International Searching Authority for International Application No. PCT/EP2016/065852.

L. Wu et al., "Cryptomaniac: A Fast Flexible Architecture for Secure Communication", Proceedings of the 28$^{th}$ International Symposium on Computer Architecture, Jun. 30, 2001, pp. 111-114.

* cited by examiner

MIXED HARDWARE AND SOFTWARE INSTRUCTIONS FOR CRYPTOGRAPHIC FUNCTIONALITIES IMPLEMENTATION

FIELD OF THE INVENTION

The present invention relates to a device having a central processing unit, RAM memory and at least two hardware specific elementary set of instructions, called hardware elementary operations.

The invention also pertains to a method to implement different cryptographic functionalities in a device of the invention.

BACKGROUND OF THE INVENTION

Embedded devices have to perform in a secure and fast way cryptographic algorithms for a long time. There exist today mainly two alternatives to implement such cryptographic algorithms: a full hardware implementation, with which, as soon as a breach is found, the software has none path to avoid it and a full software implementation generally not in line with the performances required on the market field.

Medium implementations propose to mix software and hardware implementation. Infineon thus proposes in some hardware product family a processor that implements some very basics sub-functions, single permutations and rotation for DES/AES, in hardware for the implementation of Crypto DES/AES algorithms. The implementation is thus not a full hardware one but is limited those algorithms and having very limited and fixed advantages.

Others are generally full hardware solutions without possibility to run unitary sub-functions and no possibility to change or control any 'principle of randomization' which is fixed by HW.

Existing implementations thus lack of flexibility when the cryptographic algorithms are implemented fully in hardware. In front of the numerous new attacks published each year, this is an increasingly important issue. Moreover the lack of flexibility also affects the optimization of hardware resources to address the different functionalities of the final product implying the implementation of several kinds of cryptographic algorithms.

Further alternative and advantageous solutions would, accordingly, be desirable in the art.

SUMMARY OF THE INVENTION

The present invention aims at offering a cryptographic algorithms implementation presenting flexibility while not harming performances.

The present invention is defined, in its broadest sense, as a device having a central processing unit, RAM memory and at least two hardware specific elementary set of instructions, called hardware elementary operations, using registers of greater size than the one of the central processing unit, said hardware elementary operations having inputs/outputs/intermediary data compatible with masking, said device being such that:
    construction of at least one part of RAM memory is managed only by the hardware elementary operations, said hardware elementary operations themselves and masking of inputs/outputs/intermediary data are monitored by software instructions,
    said software instructions being able to address different cryptographic functionalities using said hardware elementary operations according to several ways depending on each concerned functionality, said software instructions being further able to address several levels of security in the execution of the different functionalities.

By elementary operations, it is meant operations occurring on a specified word size in cryptographic algorithms, such as exclusive Boolean, AES shiftROW . . . .

The invention proposes a mix of dedicated hardware instructions and software process to optimize secure implementation of Cryptographic algorithms. Some dedicated hardware, named hardware elementary operations are not only dedicated to only DES or AES sub functions, but also to optimize other algorithms like SHA1/2, CAVE, etc, typically implemented in smart cards products in diverse business fields. The full control of a dedicated fast RAM constructed by the hardware elementary operations by specific instructions allows to change/control the 'principle of randomization' implemented to adapt to specific requirements of products/customers or to increase the security of product with a software patch. The invention thus provides a flexibility level unknown until now.

The invention also enables the establishment of trade-offs in terms of security, code size, RAM size, silicium gates numbers and execution time.

The invention enables to increase performance thanks to the hardware elementary operations and to dedicated RAM. Besides it enables a high flexibility of countermeasures offering a great adaptability to new attacks as hardware elementary operations can be chosen differently while considering the targeted security level. Indeed dedicated hardware instructions are elementary operations and chaining these elementary operations allows implementing Cryptographic algorithms. Elementary operations can also be chained in such a manner that internal states/variables are never manipulated in 'clear' text but always in 'masked' format. As masks change at every execution, the leakage of hardware cannot be correlated with internal states/variables. Implementing an algorithm in such way represents a 'countermeasure'. With the invention different countermeasures are possible: more or less resistant, more or less time consuming, etc. Flexibility comes with the fact that, using elementary operations enables to make the chaining done by software and so it can be changed and adapted to different use-cases, new attack published, etc.

Also hardware design enables to reach a register size greater than the one of the CPU. The goal is to accelerate the computation by executing elementary operation directly on amount of data bigger than possibility of CPU register. It implies the use of registers of greater size of core CPU.

Specific instructions greater than the core CPU size, typically 64-bits instructions, are thus concerned by the invention as soon as they can be qualified as «elementary operations» repeatedly performed during the cryptographic calculations and for which all the input/output/intermediary data can be mastered and masked by software. Optimally, chosen operations are ones which are costly in software in terms of code and execution time. The obtained cryptographic implementation will smartly mix the software and hardware instructions and RAM to get a compromise between performance, silicium gate number and flexibility.

In a preferred embodiment, at least one hardware elementary operation is present in several cryptographic functionalities.

The presence of the elementary operations in several cryptographic functionalities enables to share hardware resources. The number of silicium gates can be reduced as gates are used for elementary operations shared by several algorithms. This feature enables to mutualize the hardware resources. It can also be the case that the same hardware elementary operation is present several times in a given cryptographic functionality.

According to a hardware elementary operations implement, for their execution, rapid dedicated RAM access devoid of interaction with the central processing unit.

According to a particular feature, the rapid dedicated RAM access is used for randomization of substitution tables.

Most of crypto algorithms use pre-computed values, for example constant tables. Realizing a secure implementation including countermeasure implies that internal state/variables are not manipulated in clear format but in random 'masked' format. In consequence constant tables cannot directly be used by the algorithm but new tables depending on constant tables and on random masked used. The new tables are computed in RAM. As values are sensible in term of security and lot of accesses will be done during the algorithm execution, getting a rapid dedicated access to this RAM thanks to the invention is an important issue.

In a particular embodiment, RAM memory comprises sensible randomized tables used by software instructions to execute at least a cryptographic functionality in a secure way without any values exploitable leakage.

In a secure implementation, RAM content is different for each execution. The leakage is due to hardware, but as value stored in the RAM are masked using random, the leakage is not exploitable for an attacker.

According to specific implementation, hardware elementary operations are chosen among: EXCH, MOV, XNOR, TEST_ZERO, SLL, SRL, ROTL, ROTL, XOR, AND, OR, ADD, SET_PERMUT_SEED, INIT_PERMUT_COUNT, GEN_PERMUT, WR_RAM8, WR_RAM4H, WR_RAM4L, ARITH2BOOL, BOOL2ARITH, AES_SHIFTROWL, SHIFTROWH, AES_MIXCOL64, AES_SUBBYTE32L, AES_SUBBYTE32H, AES_INVSHIFTROWL, AES_INVSHIFTROWH, AES_INVMIXCOL64, AES_INVSUBBYTE32L, AES_INVSUBBYTE32H, AES_SBOX_RAM, DES_LOAD_KEY, DES_KEYSCHEDULE_ENC, DES_KEYSCHEDULE_DEC, DES_PC2, DES_INITPERM, DES_FINALPERM, DES_EXPAND, DES_PERMUTE, DES_SBOX, DES_SBOX_RAM, DES_KEY_PACK, DES_KEY_UNPACK, MULT_2_128.

The choice of hardware elementary operations among the list enables to reuse all hardware elementary operations in several cryptographic functionalities as soon as a software is generated in accordance with the implementation of this cryptographic functionality, said software calling these elementary operations.

The present invention also relates to a method to implement different cryptographic functionalities in a device having a central processing unit, RAM memory and at least two hardware specific elementary set of instructions, called hardware elementary operations, using registers of greater size than the one of the central processing unit, said hardware elementary operations having inputs/outputs/intermediary data compatible with masking, said method comprising the steps of:

developing software instructions to monitor hardware elementary operations and masking of inputs/outputs/intermediary data, said software instructions being able to address the different cryptographic functionalities using said hardware elementary operations according to several ways depending on each concerned functionality, customizing software instructions to address several levels of security in the execution of the different functionalities, storing the obtained software instructions for further execution of the cryptographic functionalities.

This method enables to develop software instructions to exploit the hardware elementary operations, themselves working independently with the dedicated RAM memory.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

Figure 1:
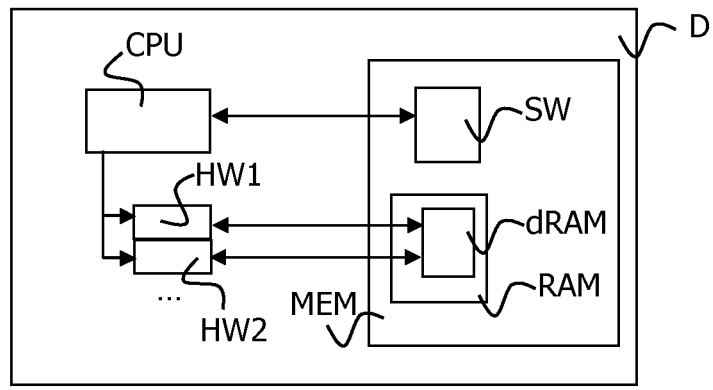
FIG. 1 represents a device of the type to which the present invention is applied as an embodiment.

For a more complete understanding of the invention, the invention will now be described in detail with reference to the accompanying drawings. The detailed description will illustrate and describe what is considered as a preferred embodiment of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed hereinafter. The same elements have been designated with the same references in the different drawings. For clarity, only those elements and steps which are useful to the understanding of the present invention have been shown in the drawings and will be described.

FIG. 1 schematically shows a device D of the type to which the present invention is applied as an embodiment. The device D comprises a core central processing unit CPU, a memory MEM including Random Access Memory RAM and at least two hardware specific elementary set of instructions, called hardware elementary operations HW1 and HW2. The hardware elementary operations use registers of greater size than the one of the CPU. Each operation HW1 and HW2 has inputs/outputs/intermediary data compatible with masking. Such compatibility enables to protect the transfer of data between the operations HWi and during data manipulations by software.

According to the invention, a dedicated part of the RAM memory dRAM is constructed by only hardware elementary operations HWi. Such a construction enables very fast access to the dedicated RAM memory dRAM by the hardware elementary operations HWi.

The memory stores software instructions SWI monitoring said hardware elementary operations HWi themselves and the masking of inputs/outputs/intermediary data.

Software instructions SWI address different cryptographic functionalities Fi using said hardware elementary operations HWi according to several ways as a function of concerned functionality.

Software instructions SWI are further able to address several levels of security SL in the execution of the different functionalities Fi.

Figure 2:
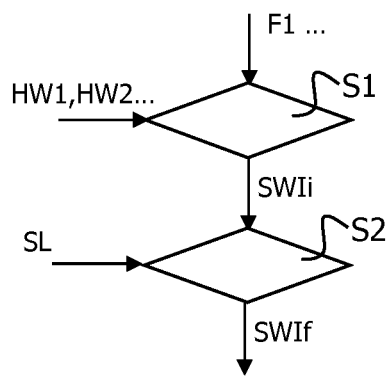
FIG. 2 shows a flowchart of a method of the invention.

FIG. 2 schematically shows a method of the invention to develop final software instructions SWf to implement different cryptographic functionalities Fi according to a given level of security SL.

According to the invention, the method comprises a first step S1 of, for functionality F1, developing intermediate software instructions SWIi to monitor hardware elementary operations and masking of inputs/outputs/intermediary data to address the cryptographic functionality using said hardware elementary operations according to a way specific to the concerned functionality.

It then comprises a step S2 of customizing software instructions SWIi to address a specific level of security SL in the execution of functionality F1. A final set of software instructions SWIf is thus obtained and stored in the device for further execution of the functionality F1.

Below, on each line of the table, is given an example of hardware elementary operation performed using a register larger than the one of the central processing unit CPU. Hardware elementary operations are here grouped, each group corresponding to toolbox of mathematic or logical basic operations (shift, xor, and, or, add, etc) or algorithm dedicated operation for DES (Data Encrypted Standard) or AES (Advanced Encrypted Standard). The first below table is a generic toolbox to be used for cryptographic operations.

| | |
|---|---|
| S8_CRYPTO_OP_EXCH | Exchange 32 bits right and 32 bits left of a 64 bit register |
| S8_CRYPTO_OP_MOV | Move content of 64 bits registers |
| S8_CRYPTO_OP_XNOR | Perform NOT (A XOR B) on 64 bits registers |
| S8_CRYPTO_OP_TEST_ZERO | Test in 64 bits register equals '0' |
| S8_CRYPTO_OP_SLL | Shift left of a 64 bits register |
| S8_CRYPTO_OP_SRL | Shift right of a 64 bts register |
| S8_CRYPTO_OP_ROTL | Left rotate of a 64 bits register |
| S8_CRYPTO_OP_ROTL | Right rotate of a 64 bits register |
| S8_CRYPTO_OP_XOR | Perform (A XOR B) on 64 bits registers |
| S8_CRYPTO_OP_AND | Perform (A AND B) on 64 bits registers |
| S8_CRYPTO_OP_OR | Perform (A OR B) on 64 bits registers |
| S8_CRYPTO_OP_ADD | Perform (A + B) on 64 bits registers |
| S8_CRYPTO_OP_SET_PERMUT_SEED | Seed the HW Permutation engine |
| S8_CRYPTO_OP_INIT_PERMUT_COUNT | Set the HW Permutation engine |
| S8_CRYPTO_OP_GEN_PERMUT | Generate a Random Permutation |
| S8_CRYPTO_OP_WR_RAM8 | Write 8 bits in Dedicated RAM |
| S8_CRYPTO_OP_WR_RAM4H | Write 4 bits high in Dedicated RAM |
| S8_CRYPTO_OP_WR_RAM4L | Write 4 bits low in Dedicated RAM |
| S8_CRYPTO_OP_ARITH2BOOL | Change Arithmetic Mask (A + R) into Boolean Mask (A XOR R'), data in 64 bits registers |
| S8_CRYPTO_OP_BOOL2ARITH | Change Boolean Mask (A XOR R) into Arithmetic Mask (A + R'), data in 64 bits registers |
| S8_CRYPTO_MULT_2_128 | Perform A MULT B in Galois Field 2^128, data in 64 bits registers |

The above table lists hardware elementary operations as useful in a toolbox useful for the algorithm dedicated operation for Encryption Standards.

In the following table, hardware elementary operations as useful for the implementation of an AES based algorithm are listed.

| | |
|---|---|
| S8_CRYPTO_OP_AES_SHIFTROWL | Perform AES Shiftrow operation for low rows, data in 64 bits register |
| S8_CRYPTO_OP_AES_SHIFTROWH | Perform AES Shiftrow operation for high rows, data in 64 bits register |
| S8_CRYPTO_OP_AES_MIXCOL64 | Perform AES MixColumn, data in a 64 bits register |
| S8_CRYPTO_OP_AES_SUBBYTE32L | Perform AES SubByte operation for low rows, data in 64 bits register |
| S8_CRYPTO_OP_AES_SUBBYTE32H | Perform AES SubByte operation for low rows, data in 64 bits register |
| S8_CRYPTO_OP_AES_INVSHIFTROWL | Perform AES Inverse Shiftrow operation for low rows, data in 64 bits register |
| S8_CRYPTO_OP_AES_INVSHIFTROWH | Perform AES Inverse Shiftrow operation for high rows, data in 64 bits register |
| S8_CRYPTO_OP_AES_INVMIXCOL64 | Perform AES Inverse MixColumn, data in a 64 bits register |
| S8_CRYPTO_OP_AES_INVSUBBYTE32L | Perform AES Inverse SubByte operation for low rows, data in 64 bits register |
| S8_CRYPTO_OP_AES_INVSUBBYTE32H | Perform AES Inverse SubByte operation for high rows, data in 64 bits register |
| S8_CRYPTO_OP_AES_SBOX_RAM | Read the content dedicated RAM for AES (8 bytes access) |

In the following table, hardware elementary operations as useful for the implementation of DES based algorithm and others are listed.

| | |
|---|---|
| S8_CRYPTO_OP_DES_LOAD_KEY | Load the DES Key from CPU register into 64 bits register and perform 'DES Permutation Choice1', data in a 64 bits register |
| S8_CRYPTO_OP_DES_KEYSCHEDULE_ENC | Compute Next KeySheduled for Encryption (Left Shift of C/D) data in a 64 bits register |
| S8_CRYPTO_OP_DES_KEYSCHEDULE_DEC | Compute Next KeySheduled for Decryption (Left Shift of C/D) data in a 64 bits register |
| S8_CRYPTO_OP_DES_PC2 | Perform 'DES Permutation Choice 2', data in a 64 bits register |
| S8_CRYPTO_OP_DES_INITPERM | Perform 'DES Initial Permutation', data in a 64 bits register |
| S8_CRYPTO_OP_DES_FINALPERM | Perform 'DES Inverse Initial Permutation', data in a 64 bits register |
| S8_CRYPTO_OP_DES_EXPAND | Perform 'DES Expand (32 bits -> 48 bits)', data in a 64 bits register |
| S8_CRYPTO_OP_DES_PERMUTE | Perform 'DES Permutation (32 bits -> 32 bits)', data in a 64 bits register |
| S8_CRYPTO_OP_DES_SBOX | Read the content of DES Sbox (6 bits -> 4 bits), data in a 64 bits register |
| S8_CRYPTO_OP_DES_SBOX_RAM | Read the content of the dedicated RAM (6 bits -> 4 bits) into a 64 bits register |
| S8_CRYPTO_OP_DES_KEY_PACK | Pack a DES Subkey (48 bits in 8 bytes -> 48 bits in 6 bytes) into a 64 bits register |
| S8_CRYPTO_OP_DES_KEY_UNPACK | Unpack a DES SubKeys (48 bits in 6 bytes -> 48 bits in 8 bytes) into a 64 bits register |

All these hardware elementary instructions are called several times during the execution of a corresponding algorithm. The invention enables a faster execution as with software instructions. A tradeoff should be found between the silicon gate number required by the hardware implementation of the elementary operations and the execution time reduction.

Such a tradeoff will result in an implementation of a group of elementary operations as listed in the above presented tables. In priority, the operations which are costly in software in terms of code and execution time will be chosen as soon as all input/output and intermediary data of these operations can be mastered and masked. Preferably the chosen operations will be present in several cryptographic algorithms.

All operations in the tables are calling a specific dedicated RAM memory to which they are alone to access, meaning that the CPU does not access this dedicated RAM memory. The rapid dedicated RAM access without interaction with the principal CPU enables to increase performance and is useful for the randomization of substitution tables which are present in a great number of cryptographic algorithms. This RAM memory contains sensible randomized table, mandatory to execute cryptographic algorithm in a secure manner, i.e. resistant to side-channel attacks.

This dedicated RAM is dedicated to the implementation of hardware elementary operations but not dedicated to a specific algorithm. It is indeed shared which optimizes 'Silicium' gates. Being accessible only with specific instructions, no dump is a priori possible using fault attack, etc.

The construction of the content of this RAM is done by software, i.e. no HW instruction. It allows modification of the security of an implementation with the same HW. For a secure implementation, the values of the RAM depend on (constant table, random mask, countermeasure chosen), the value of data to put in this dedicated RAM is computed by software but the storage of this value, read and write instructions, is performed thanks to dedicated hardware instructions. The flexibility of such construction allows to update the countermeasure, i.e. value to store, with the same HW instructions to access, i.e. read/write, the RAM.

For DES and AES operations as listed above, the operations have been chosen to get a maximal performance and maximal flexibility to build different security levels. The level of instruction is also addressed for this purpose. The security level enables to arbitrate on the choice of the algorithm AES or DES or on internal specific implementation choosing between a fast implementation or a full secure one.

Cryptography algorithms are used in different use-cases: integrity, authenticity, confidentiality, etc. There are used in different business: telecommunication, banking application, identity, etc. Performance and security resistance to physical attacks are various depending on the link to business and nature of data to protect. Implementing a cryptographic algorithm according to a full hardware implementation does not allow to get the flexibility to respond to all use-cases at best. Full software implementation allows to get full flexibility but no satisfying performance. Mix of hardware and software according to the invention is a very good answer to get both.

In the above detailed description, reference is made to the accompanying drawings that show, by way of illustration, specific embodiments in which the invention may be practiced. These embodiments are described in sufficient detail to enable those skilled in the art to practice the invention. The above detailed description is, therefore, not to be taken in a limiting sense, and the scope of the present invention is defined only by the appended claims.

The invention claimed is:

1. A device having a central processing unit, RAM memory and at least two hardware specific elementary set of instructions, called hardware elementary operations, using registers, wherein each of the registers is of greater capacity size than the one of the central processing unit, said hardware elementary operations having inputs/outputs/intermediary data compatible with masking, said device being such that:

construction of at least one part of the RAM memory is managed only by the hardware elementary operations and independent of the central processing unit, wherein the RAM memory comprises sensible randomized tables used by software instructions to execute at least a cryptographic functionality in a secure way without any values leakage, said hardware elementary operations themselves and masking of inputs/outputs/intermediary data are monitored by said software instructions, said software instructions being able to address different cryptographic functionalities using said hardware elementary operations according to several ways depending on each concerned functionality, said software instructions being further able to address several levels of security in the execution of the different functionalities.

2. The device according to claim 1, wherein at least one hardware elementary operation is present in several cryptographic functionalities.

3. The device according to claim 1, wherein said hardware elementary operations implement, for their execution, rapid dedicated RAM access devoid of interaction with the central processing unit.

4. The device according to claim 3, wherein the rapid dedicated RAM access is used for randomization of substitution tables.

5. The device according to claim 1, wherein said hardware elementary operations are chosen among: EXCH, MOV, XNOR, TEST_ZERO, SLL, SRL, ROTL, ROTL, XOR, AND, OR, ADD, SET_PERMUT_SEED, INIT_PERMUT_COUNT, GEN_PERMUT, WR_RAM8, WR_RAM4H, WR_RAM4L, ARITH2BOOL, BOOL2ARITH, AES_SHIFTROWL, SHIFTROWH, AES_MIXCOL64, AES_SUBBYTE32L, AES_SUBBYTE32H, AES_INVSHIFTROWL, AES_INVSHIFTROWH, AES_INVMIXCOL64, AES_INVSUBBYTE32L, AES_INVSUBBYTE32H, AES_SBOX_RAM, DES_LOAD_KEY, DES_KEYSCHEDULE_ENC, DES_KEYSCHEDULE_DEC, DES_PC2, DES_INITPERM, DES_FINALPERM, DES_EXPAND, DES_PERMUTE, DES_SBOX, DES_SBOX_RAM, DES_KEY_PACK, DES_KEY_UNPACK, MULT_2_128.

6. A method to implement different cryptographic functionalities in a device having a central processing unit, RAM memory and at least two hardware specific elementary set of instructions, called hardware elementary operations, using registers, wherein each of the registers is of greater capacity size than the one of the central processing unit, said hardware elementary operations having inputs/outputs/intermediary data compatible with masking, said method comprising the steps of:

managing at least one part of the RAM memory only by the hardware elementary operations and independent of the central processing unit, wherein the RAM memory comprises sensible randomized tables used by software instructions to execute at least a cryptographic functionality in a secure way without any values leakage, developing said software instructions to monitor hardware elementary operations and masking of inputs/outputs/intermediary data, said software instructions being able to address the different cryptographic functionalities using said hardware elementary operations according to several ways depending on each concerned functionality, customizing software instructions to address several levels of security in the execution of the different functionalities, and storing the obtained software instructions for further execution of the cryptographic functionalities.

* * * * *